Oct. 13, 1925. 1,556,985
K. BARTL
HANDLE FOR HAND GLASS BLOWING CONTRIVANCES
Filed Feb. 8, 1924

Witnesses:

Inventor:
Karl Bartl

Patented Oct. 13, 1925.

1,556,985

UNITED STATES PATENT OFFICE.

KARL BARTL, OF KOMOTAU, CZECHOSLOVAKIA.

HANDLE FOR HAND GLASS-BLOWING CONTRIVANCES.

Application filed February 8, 1924. Serial No. 691,519.

*To all whom it may concern:*

Be it known that I, KARL BARTL, a citizen of the Czechoslovakian Republic, and residing at Sporitz No. 235, near Komotau, Bohemia, in said Republic, have invented certain new and useful Improvements in a Handle for Hand Glass-Blowing Contrivances, of which the following is a specification.

This invention relates to an improved handle for hand glass-blowing contrivances, of the type having a compressed-air supply controlled by a spring-pressed valve adapted to be operated from outside the handle, one end of said handle being connected with the compressed-air supply pipe and its other end with a blowing pipe. The novelty consists in making the handle of two parts in rotatable connection with one another, so that the handle can be held at one part, to which the air supply pipe is attached, by one hand with one finger on the outer control knob of said valve while the other part, to which the blowing pipe is attached, can be freely turned on said first part by the other hand of the operator.

Figure 1:
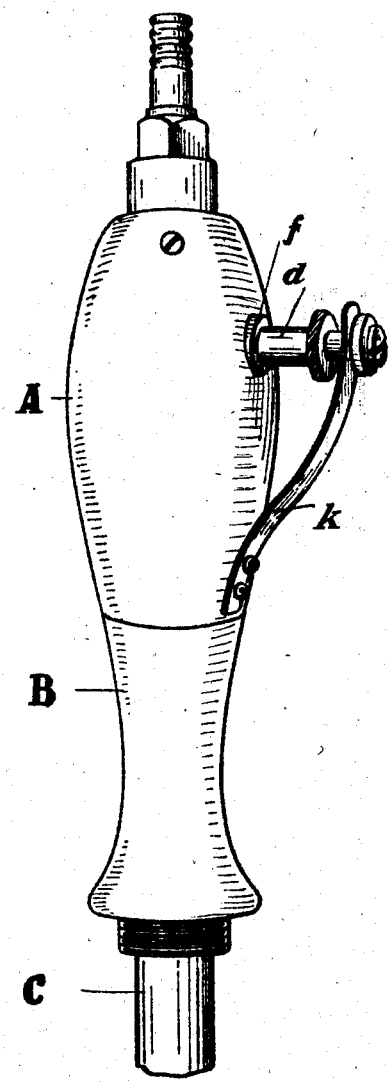
Figure 2:
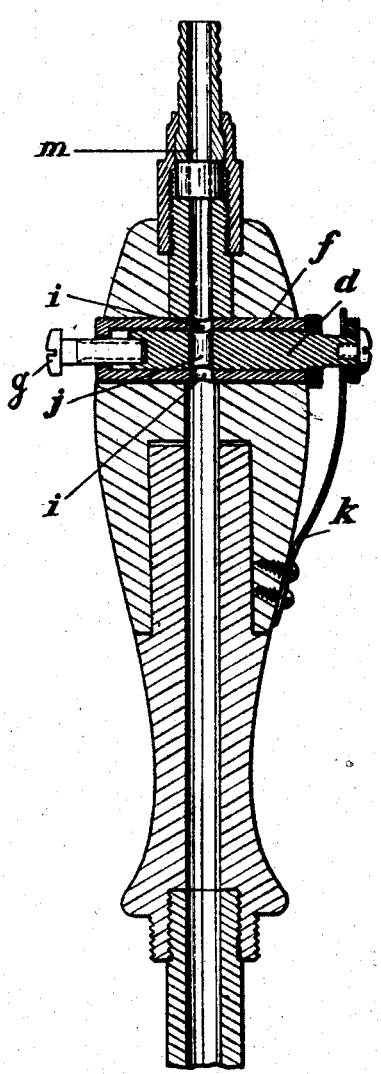

The improved handle is illustrated on the accompanying drawing, in which Fig. 1 is a perspective view of the same, while Fig. 2 is a central longitudinal section.

The handle comprises two centrally perforated parts A and B, which are in rotatable connection with one another. The lower part B carries the blowing-pipe $c$ while its upper part A is fitted with the compressed-air supply pipe $m$ and with a valve for controlling the supply of compressed-air from the latter to the blowing-pipe $c$. Said valve consists in a way known in the art of a cylinder $f$ traversing the handle part A and having two holes $i$ coinciding with the central perforation of the handle, and of a plunger $d$ in said cylinder which has a cross-hole $j$ therein adapted to coincide with said central perforation, said plunger being guided with a boundary knob $g$ at one end in one face wall of said cylinder and extending through the other end of said cylinder where it is acted upon by a pressure-spring $k$ that tends to normally keep the plunger in its position for closing the central perforation of the handle (Fig. 1). By pressing the plunger more or less into the cylinder by hand against the action of the spring $k$ the bore of said central perforation can be completely freed (Fig. 2) or more or less narrowed and thus the supply of compressed-air to the blowing-pipe $c$ from the supply pipe $m$ can be controlled at will, to suit requirements.

The rotatable connection between the two handle parts serves to allow a rotation of the lower handle part $b$ with the blowing-pipe $c$ thereon, independently of the upper part A, required for blowing round glass containers, or the like.

What I claim, is:—

In combination: a hollow handle for hand glass-blowing contrivances, a compressed-air supply pipe connected to one end and a blowing pipe connected to the other end of the handle, a spring-pressed valve in the handle for a control of the compressed-air supply, and a knob on said valve for its operation from outside the handle; said handle consisting of two parts in rotatable connection with one another, so that it can be held at one part, to which the air supply pipe is attached, by one hand with one finger on the operating knob of the valve while the other part, to which the blowing pipe is attached, can be freely turned on said first part by the other hand of the operator.

In testimony whereof I have hereunto set my hand.

KARL BARTL.